(12) United States Patent
Mori

(10) Patent No.: US 6,606,683 B2
(45) Date of Patent: Aug. 12, 2003

(54) INFORMATION RECORDING APPARATUS AND CONTROL METHOD THEREOF

(75) Inventor: Yoshiaki Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 168 days.

(21) Appl. No.: 09/745,732

(22) Filed: Dec. 26, 2000

(65) Prior Publication Data

US 2001/0008008 A1 Jul. 12, 2001

(30) Foreign Application Priority Data

Dec. 27, 1999 (JP) .......................................... 11-370116

(51) Int. Cl.⁷ .............................................. G06F 12/16
(52) U.S. Cl. ...................................................... 711/114
(58) Field of Search ................................ 711/112, 114; 714/6

(56) References Cited

U.S. PATENT DOCUMENTS

| | | | | |
|---|---|---|---|---|
| 5,455,934 A | * | 10/1995 | Holland et al. ............. | 395/404 |
| 5,699,510 A | * | 12/1997 | Petersen et al. ....... | 395/185.07 |
| 6,230,240 B1 | * | 5/2000 | Shrader et al. ............. | 711/114 |
| 6,073,218 A | * | 6/2000 | DeKoning et al. .......... | 711/150 |
| 6,085,333 A | * | 7/2000 | DeKoning et al. ............. | 714/7 |
| 6,397,293 B2 | * | 5/2002 | Shrader et al. ............. | 711/114 |

* cited by examiner

Primary Examiner—Kevin L. Ellis
(74) Attorney, Agent, or Firm—Whitman, Curtis & Christofferson, PC

(57) ABSTRACT

To provide an information recording apparatus capable of continuing appropriate update processing in the case where data updating processing is stopped on one processing apparatus due to a power failure or memory failure, etc. by using un-updated data stored in duplicate in the other processing apparatus. There is provided an information recording apparatus including a plurality of controlling units for recording data received from a host device on an information recording medium, each of which has memory, characterized in that the data is temporarily stored in memory of one controlling unit and at the same time is stored in duplicate in memory of another controlling unit and, when data recording processing carried out by the one controlling unit is stopped, the recording processing is continued by the other controlling unit by using the duplicated data, and a point at which the data updating processing in the one control apparatus becomes irreversible is notified from the control apparatus to the control apparatus having the duplicated data.

7 Claims, 10 Drawing Sheets

FIG.5(a) WHEN PARITY DATA IS DESTROYED
(ALL HDDs ARE AVAILABLE)
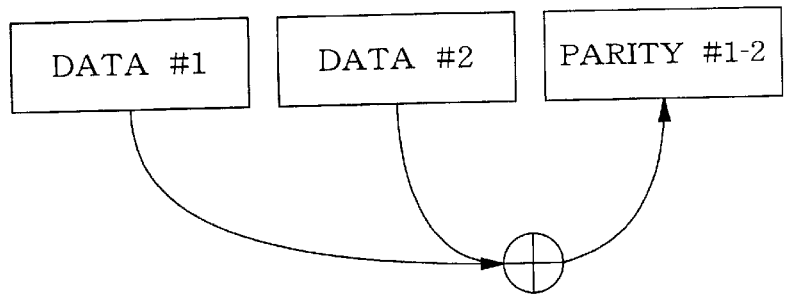
FIG.5(b) WHEN PARITY DATA IS DESTROYED
(1 HDD IS NOT AVAILABLE)
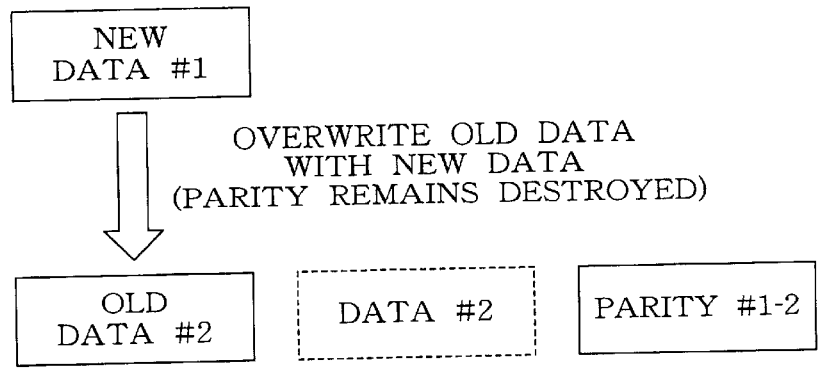
FIG.5(c) WHEN PARITY DATA IS DESTROYED
(1 HDD IS NOT AVAILABLE)
OPERATION OF WRITE TO DATA#2
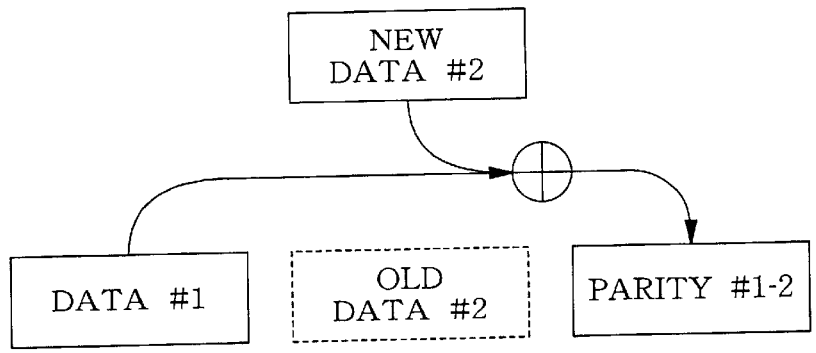
NEW DATA (DATA #2) IS NOT WRITTEN
ONLY PARITY IS REPAIRED WITH PARITY GENERATED

INFORMATION RECORDING APPARATUS AND CONTROL METHOD THEREOF

BACKGROUND OF THE INVENTION

1. Field of the Invention

The present invention relates to an information recording apparatus and an information recording method using the information recording apparatus, and more particularly, to an information recording apparatus and an information recording method using the information recording apparatus that stores un-updated data in duplicate in more than two physically independent memories and thereby continues the updating processing, when data processing by one processing apparatus is stopped due to a power failure or memory failure, etc., by using un-updated data duplicated on the other processing apparatus.

2. Description of the Prior Art

A disk array apparatus writes data distributed into a plurality of disks, creates redundant data based on this data, writes this data in separate disks and thereby prevents loss of data due to disk failures. Even if a disk fails, such a disk array apparatus can restore the data as far as the level of redundancy permits and the data is not lost unless disks exceeding in number the level of redundancy fail. However, data may be lost in the case where data is not properly written in the disk, which will be described later.

Unlike a single disk, the disk array apparatus cannot perform a data write in one access. That is, the disk array apparatus requires processing in a plurality of stages such as reading old data which is originally written in the area in which data is to be written and an old parity on this old data, generating new parity data by using this data and data to be newly written and writing this data in a disk. Therefore, since the number of times in which the disk is accessed increases, which reduces the performance, a method of incorporating a cache memory in the disk array apparatus and notifying a host device of the completion of data write when a data transfer from the host device to the cache memory is completed.

In this method, the completion of data write is notified when the data transfer from the host device to the cache memory is completed, and therefore protection of data being written is an absolute condition. However, this method requires un-updated data to be held in the cache memory for a long time, which is likely to lead to data loss due to a memory failure or power failure, etc. For this reason, two control apparatuses are provided, data, which is to be processed between these apparatuses, is copied and thus data is controlled in duplicate.

BRIEF SUMMARY OF THE INVENTION

Object of the Invention

Thus, providing duplicated data reduces the possibility of data being lost due to a memory failure, power failure, etc., but maintaining consistency between the data recorded in the disk and redundant data such as parity related to this data is an important element for the disk array apparatus and losing this consistency will cause wrong data to be sent to the host device.

RAID (Redundant Array of Inexpensive Disks) uses a data distribution method having several levels. For example, there are various methods, like a method called "level 3" (RAID 3) in which data received from the host device is always divided into a plurality of disks, redundant data is created simultaneously with this division of data and these data items are written simultaneously as a data group whose consistency should be maintained or another method called "level 5" (RAID 5) in which data is divided into sectors and written and parity information is added as another sector as in the case of normal data.

FIG. 10 illustrates an example of data arrangement on disks that make up the RAID 5. The following two methods are available as data update methods in the disk array apparatus with such disk arrangement:

(1) Method of generating parity data by reading all data groups; whose consistency should be maintained (2) Method of generating parity data using old data Here, the case where a write to a block (Data #01) from the host device is executed will be taken as an example. In the method (1), block data (Data #09), (Data #11) and (Data #19) are read from hard disks #2, #3 and #4, respectively and new parity data is generated from these block data and content of new (Data #01) received from the host device, and the new (Data #01) and new parity data are written in hard disks #1 and #5, respectively. Furthermore, in the method (2), old data (Data #01) and old parity data are read from the hard disks #1 and #5, respectively, and new parity data is created from an exclusive OR between this old data, old parity data and new data (Data #01) received from the host device and the new (Data #01) and new parity data are written in the hard disks #1 and #5, respectively.

The same result can be obtained by using either method. According to the method (1), in the case where more new data sent from the host device is found in the data group whose consistency should be maintained, the number of times the disk is accessed can be a small number. However, in the case of access to small blocks, the greater the number of disks that make up RAID, the greater the required number of times the disk is accessed to update one block. On the contrary, in the method (2), the number of times the disk is accessed can be a small number even when access is made to a small block.

When the method (2) is used, creating new parity data requires the old (Data #01) to be finally overwritten with new data and the old parity data to be read. In this case, even if un-updated data is duplicated using the cache memories of the two control apparatuses, if processing is stopped by a power failure, etc. while one control apparatus is rewriting the old (Data #01) or old parity data, there is a possibility that wrong new parity data will be created when the other control apparatus takes over the disk data updating processing using the duplicated un-updated data. That is, when processing is stopped while un-updated data or new parity is being written in the disk and the other control apparatus takes over the processing using the duplicated data, there is a possibility that the old data and old parity necessary to generate new parity may have already been overwritten. Once these old data and old parity have been overwritten, it will no longer be possible to generate new parity using the above-described method.

According to the method (2), processing of data updating in the disk becomes irreversible upon starting a write of un-updated data or the new parity in the disk and attempting to continue the updating processing using the data duplicated by the backup control apparatus without realizing that this point of entering into an irreversible state is passed will end up losing data consistency.

It is an object of the present invention to provide a disk array apparatus that is equipped with a plurality of independent memories, protects un-updated data by maintaining duplicated data in these memories, capable of carrying out data updating without data getting garbled when one control apparatus stops processing due to a power failure, etc. during a data communication and the other control apparatus takes over this processing properly. It is another object of the present invention to provide a disk array apparatus capable of allowing logically consistent parity data to be used in the disk arrays preventing wrong data from being restored and transferred to the host device even if the disk array apparatus loses redundancy when the processing is stopped.

SUMMARY OF THE INVENTION

The information recording apparatus of the present invention is an information recording apparatus configured in such a way as to comprise a plurality of controlling means for recording data received from a host device on an information recording medium with each controlling means having memory, temporarily store the data in memory of one controlling means and at the same time store the data in duplicate in memory of the other controlling means and, when data recording processing carried out by the one controlling means is stopped, allow the other controlling means to continue the recording processing using the duplicated data and allow the other controlling means to continue processing of updating the data using the duplicated data, characterized in that a point at which the data updating processing in the one control apparatus becomes irreversible is notified from the control apparatus to the control apparatus having the duplicated data.

Thus, the disk array apparatus of the present invention allows a control apparatus that carries out data updating processing to notify a point at which processing of updating the data becomes irreversible to a backup control apparatus (other control apparatus) that stores duplicated data, and therefore when the backup control apparatus takes over the data updating processing, the backup control apparatus can recognize whether the updating processing is in an irreversible state or not and carry out processing according to the state.

More specifically, in the apparatus of the present invention, each controlling means comprises interface means for communicating with the recording medium, parity generating means for generating parity data on the data, inter-controlling-means information communicating means for communicating between control means and a parity generation disabling flag, and when the one recording means stops data recording processing, notification that the data recording processing becomes irreversible is made by setting the parity generation disabling flag in other recording means that stores the duplicated data to a parity generation disabled state.

Furthermore, in the apparatus of the present invention, each controlling means comprises interface means for communicating with the recording medium, parity generating means for generating parity data on the data and inter-controlling-means information communicating means for communicating information between the controlling means, and when the one recording means stops data recording processing, notification that the data recording processing becomes irreversible is made by storing parity data on the data to be subjected to the recording processing created by the one controlling means in the memory of the other recording means that stores the duplicated data.

Here, the point at which the data recording processing becomes irreversible is more specifically a point in time at which the data to be recorded or parity data on the relevant data is written in a recording medium and a preferred embodiment notifies the irreversible point by setting to a parity generation disabled state the parity generation disabling flag in the other controlling means that stores the duplicated data when this write is performed or by storing the parity data on the data in the other recording means that stores the duplicated data. This notification can be made to the backup controlling means (other controlling means) via inter-controlling-means information communicating means that communicates information between the controlling means.

The information recording method of the present invention is a method of controlling an information recording apparatus that records the data received from the host device on a recording medium, creates parity data on this data and records the parity data on a predetermined recording medium, configured in such way as to temporarily store un-updated data sent from the host device in memory of one of a plurality of recording medium controlling means each having memory, store the un-updated data in duplicate in the other controlling means, allow the one controlling means to create new parity data on the un-updated data from un-updated data sent from the host device, old data recorded in an area of the recording medium in which the un-updated data is to be recorded and parity data of the old data, write the un-updated data and the new parity data in a predetermined area of the recording medium, characterized in that when the one controlling means writes the un-updated data or the new parity data in the disk, the other controlling means that stores the duplicated data is notified of the point at which processing of recording the un-updated data becomes irreversible.

As described above, an irreversible point of data updating processing is a point in time at which un-updated data or new parity on this data is written in a predetermined disk. Therefore, by notifying the backup controlling means of information that this data updating processing has become irreversible when the new parity is written in the disk, the backup controlling means can take over the data updating processing according to need while recognizing whether the time at which the write processing is stopped is before or after the passing of the relevant point.

The irreversible point of the data updating processing can be notified by setting to a parity data generation disabled state the parity data generation disabling flag of the backup controlling means or copying and storing new parity data in the memory of the backup controlling means.

In this case, when the one controlling means stops data writing to the recording medium after the other controlling means that stores the duplicated data is notified of disabling of parity data re-generation, it is desirable to decide whether there is redundancy in the information recording apparatus or not, and if no redundancy is found, it is desirable that the duplicated data stored in the other controlling means be written in a predetermined recording medium and the memory of the other controlling means that stores the duplicated data store information that parity data on the data is invalid.

Such a configuration prevents parity data from being regenerated and rewritten based on data, which has lost consistency. More specifically, the information whether the new parity data is invalid or not is stored by destroying the ECC of this parity data.

Furthermore, when the one controlling means stops data writing to the recording medium after the other controlling means that stores the duplicated data is notified of parity data re-generation disabling, it is desirable to decide whether there is redundancy in the information recording apparatus or not, and if no redundancy is found, it is desirable to read the duplicated data stored in the other controlling means, generate new parity from data stored in a data recording area other than the area in which the data is to be recorded, overwrite this parity in a parity data writing area and erase the information that the parity data in memory of the controlling means is invalid.

Even if there is no redundancy in the disk array apparatus when writing is stopped, this allows correct data with consistency to be written if the condition is met.

In the case where the irreversible point of the data updating processing is notified by copying and storing new parity data in the memory of the backup controlling means, it is possible to continue write processing using the duplicated new parity even if the write processing is stopped after the irreversible point of data updating processing is passed. Therefore, even if the disk array has lost redundancy, it is possible to send correct data to the host device without losing data.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIGS. 5a, 5b, and 5c are block diagrams to explain recovery processing for data whose ECC has been destroyed during data recovery processing in the disk array control apparatus shown in FIG. 1;

DETAILED DESCRIPTION OF THE PREFERRED EMBODIMENTS

[First Embodiment]

Figure 1:
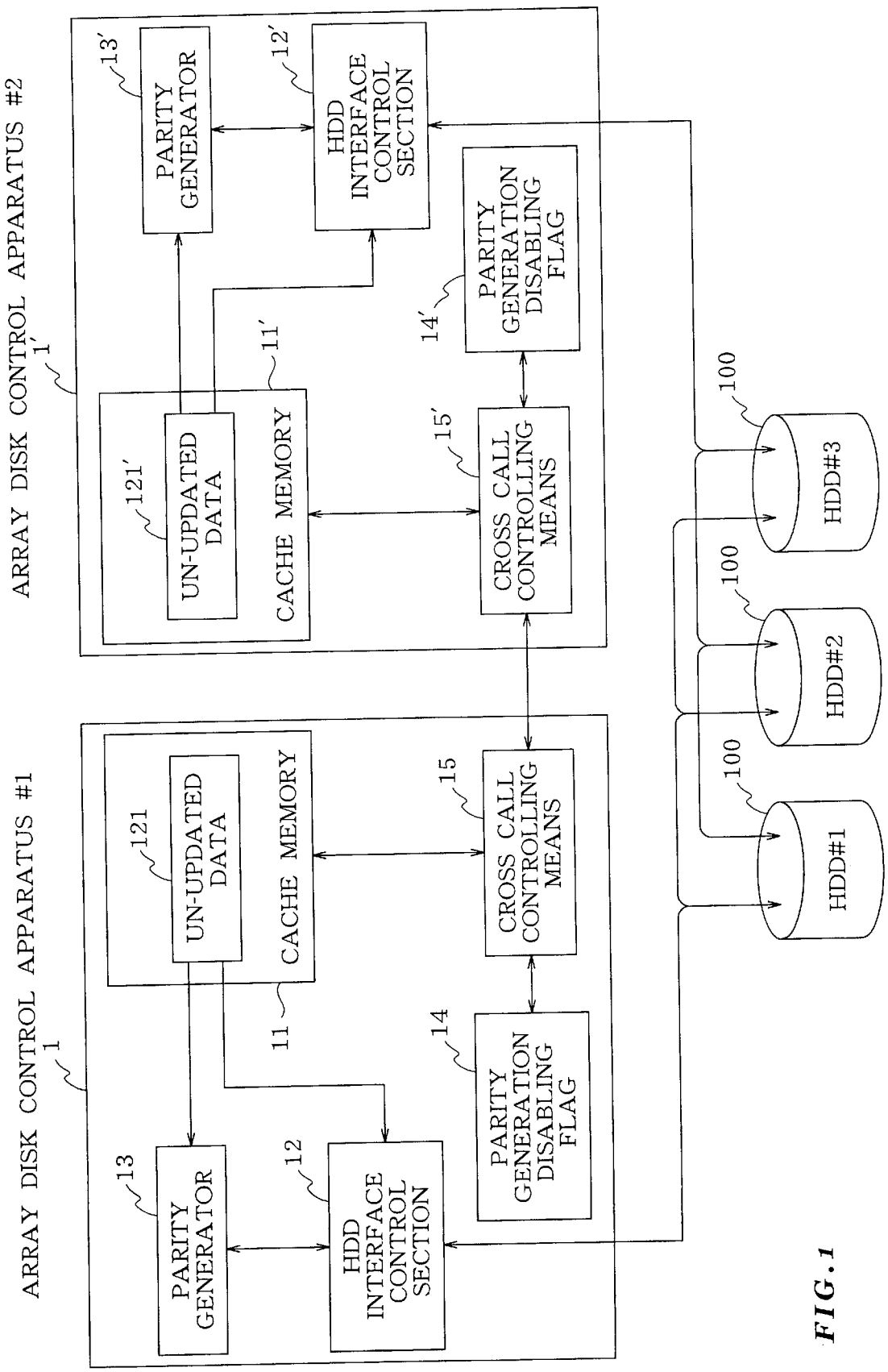
FIG. 1 is a block diagram showing a configuration of a first embodiment of a disk array control apparatus of the present invention.

With reference now to the attached drawings, embodiments of the present invention will be explained below. FIG. 1 is a block diagram showing a configuration of a first embodiment of the disk array apparatus of the present invention. This disk array apparatus is configured by a plurality of hard disks 100 and two array disk control apparatuses 1 and 1' that control these hard disks 100. The hard disks 100 are used in parallel, forming a RAID. The array disk control apparatuses 1 and 1' are connected to a host device (not shown) via their respective interfaces (not shown) and control writing of data sent from the host device in the hard disks 100. The control apparatuses 1 and 1' have the same configuration and are configured so as to communicate with each other and control data sent from the host device and stored in duplicate.

The array disk apparatus 1 comprises a cache memory 11 to temporarily store data exchanged between the host device and hard disk 100, a hard disk interface control section 12 that control the interface between the hard disk 100 and cache memory 11, a parity generator 13 that generates parity data when data is newly stored in the hard disk 100, a parity generation disabling flag 14 and cross call controlling means 15.

When un-updated data is written in the disk 100 according to a command from the host device, the parity generation disabling flag 14 is used to disable further parity generation by one array disk control apparatus while the other array disk control apparatus reads old data and old parity from the corresponding hard disk, calculates new parity and writes un-updated data and new parity in the hard disk 100. For example, in the case where the array disk control apparatus 1 writes un-updated data, the parity generation disabling flag 14' of the array disk control apparatus 1' is set to a disabled state when the new parity is written.

The cross call controlling means 15 controls communications for data duplication between the two array disk control apparatuses 1 and 1' and exchange of information between the array disk control apparatuses such as operations of the parity generation disabling flag 11.

Figure 2:
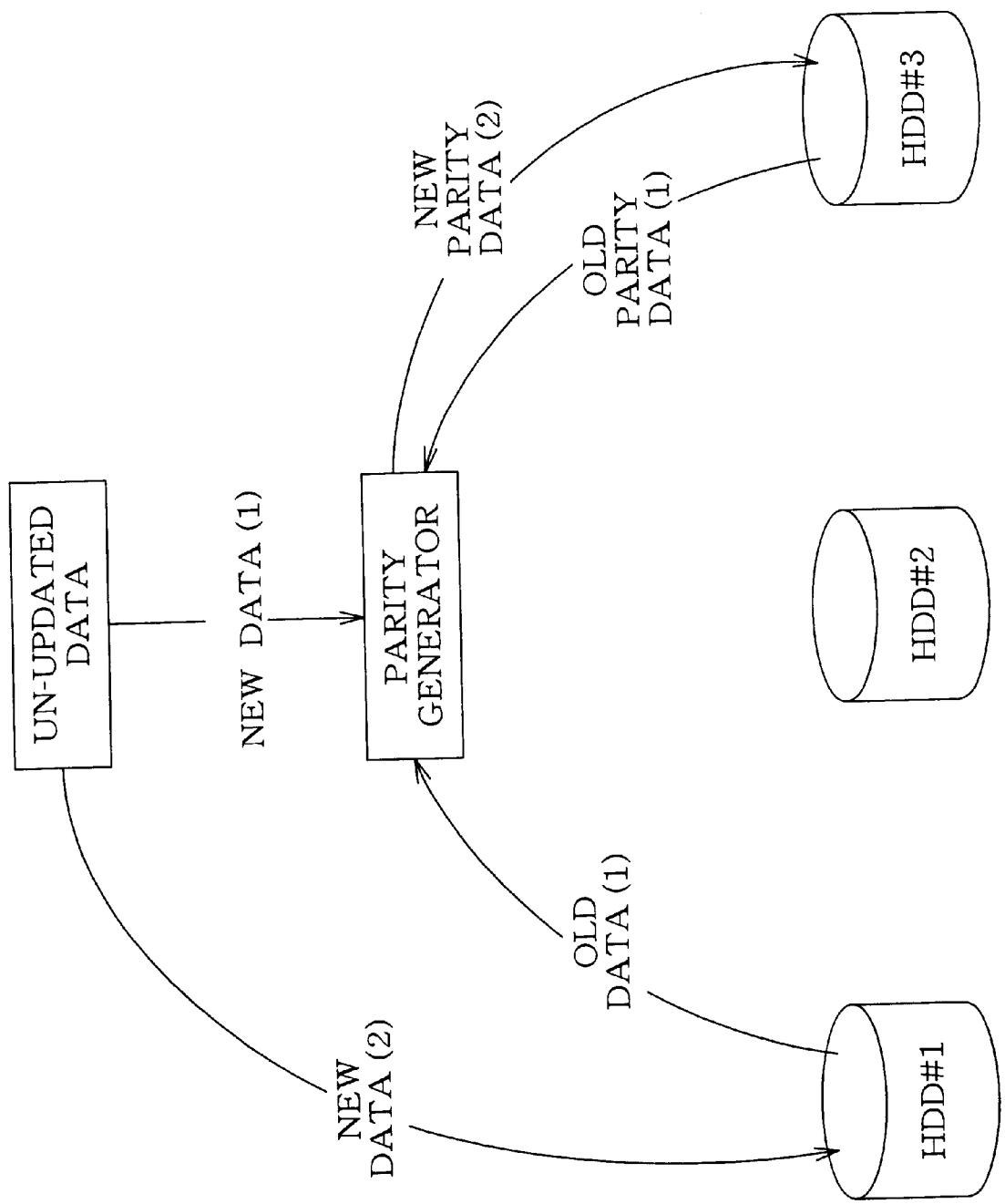
FIG. 2 is a block diagram showing a basic operation of data updating in the disk array control apparatus of the present invention.

FIG. 2 is a drawing to explain basic operations for data updating by the disk array apparatus of the present invention. Here, suppose parity data obtained from the data of the same address in a plurality of disks is used as redundant data to form a level-5 RAID.

When write data sent from the host device is stored in the cache memory 11 of the array disk control apparatus 1, this data is transferred to the cache memory 11' of the other array disk control apparatus 1' via the cross call control means 15 to duplicate the data. When the transfer for data duplication is completed correctly, a write instruction completion report is sent to the host device and storage of the un-updated data in the cache memory is completed.

Then, the array disk apparatus 1 calculates the disk number and block address at which the un-updated data is to be written, reads the old data written in the block and sends the old data to the parity generator 13 via the hard disk interface control section 12. Furthermore, the array disk apparatus 1 calculates the disk number and block address at which the parity data corresponding to this block is to be written, reads the old parity and sends the old parity to the parity generator 13 in the same way. In addition to these two data items, the cache memory 11 sends un-updated data to the parity generator 13 and the circuit 13 generates new parity from an exclusive OR of these three data items. (Corresponds to processing in Ø FIG. 2. The order of these three data items is out of the question here.)

Then, the un-updated data and newly created parity data are written in a predetermined block calculated beforehand so as to maintain data consistency between the plurality of disks 100. (Corresponds to processing in ⊘ FIG. 2. The order of these three data items is out of the question here.)

Since redundant data is created in this way, in the case where processing is stopped due to a power failure, etc. while the un-updated data and new parity data are being written in the disk 100, that is, while processing in ⊘ FIG. 2 is in progress, even if the other array disk apparatus 1' attempts to continue processing by using the duplicated, un-updated data, old data and old parity necessary to generate new parity have already been overwritten and it may be no longer possible to generate new parity using the above-described method. That is, processing of updating data to the disk 100 becomes irreversible after the point at which a write of the new parity to the disk is started, and therefore in order to maintain data consistency when one control apparatus 1 stops write processing and the other control apparatus 1' takes over the processing, it is necessary to perform write processing taking account of the time at which this irreversible point is passed.

Figure 3:
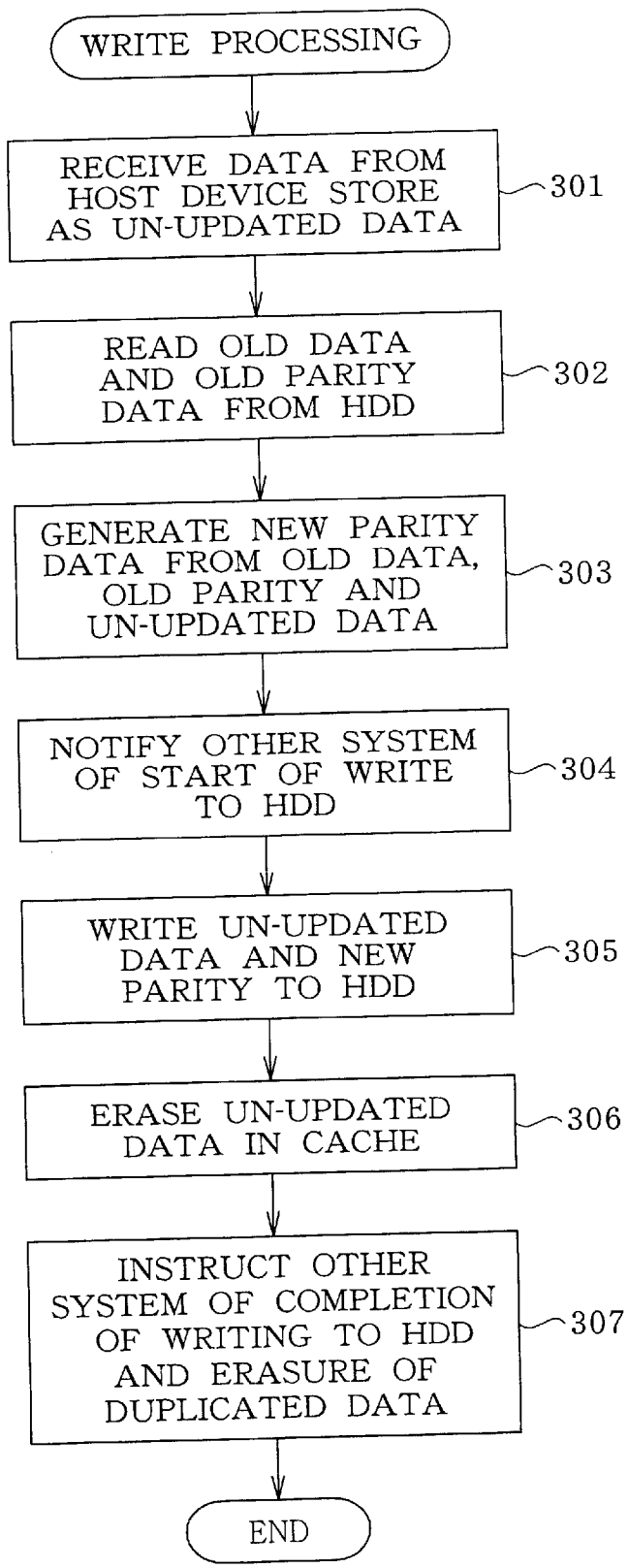
FIG. 3 is a flow chart showing data write processing in the disk array control apparatus of the present invention shown in FIG. 1.

FIG. 3 is a flow chart to explain operation of data write processing in the disk array apparatus shown in FIG. 1.

First, one array disk control apparatus 1 receives data by a write instruction from the host device and stores the data in the cache memory 11 as un-updated data 121. This data is copied to the cache memory 11' of the other array disk apparatus 1' to create duplicated un-updated data 121' (step 301).

Then, the address of the disk in which the un-updated data 121 is written and the address of the parity data corresponding to this are calculated and the old data and old parity are read from their respective storage areas (step S302). Then, the parity generator 13 calculates an exclusive OR of the old data, old parity read in this way and un-updated data 121 and creates new parity data (step 303). At this time, the start of a data write to the hard disk 100 is notified to the other array disk control apparatus 1' via the cross call controlling means 15. More specifically, the parity generation disabling flag 14' in the array disk apparatus 1' is set to a parity generation disabled state (step 304).

Then, the un-updated data 121 and new parity are written in the area calculated beforehand (step 305) and when this write is completed, the un-updated data 121 is invalidated and erased from the cache memory 11 (step 306). Furthermore, the other array disk control apparatus 1' is notified via the cross call controlling means 15 that the write to the hard disk 100 is completed and erasure of the duplicated data is instructed. More specifically, the un-updated data 121' duplicated in the cache memory 11' of the other array disk control apparatus 1' is deleted and the parity generation disabled state of the parity generation disabling flag 14' in the control apparatus 1' is canceled (step 307).

In the case where write processing in the array disk control apparatus 1 is completed normally, the other array disk control apparatus 1' only duplicates the un-updated data 121, erases duplicated un-updated data 121', sets or resets the parity generation disabling flag 14 and performs no processing of writing to the block. However, in the case where write processing is stopped due to a power failure to the array disk control apparatus 1 that performs a write, the other array disk control apparatus 1' detects this stoppage of processing and takes over the write processing using the duplicated un-updated data 121'.

Figure 4:
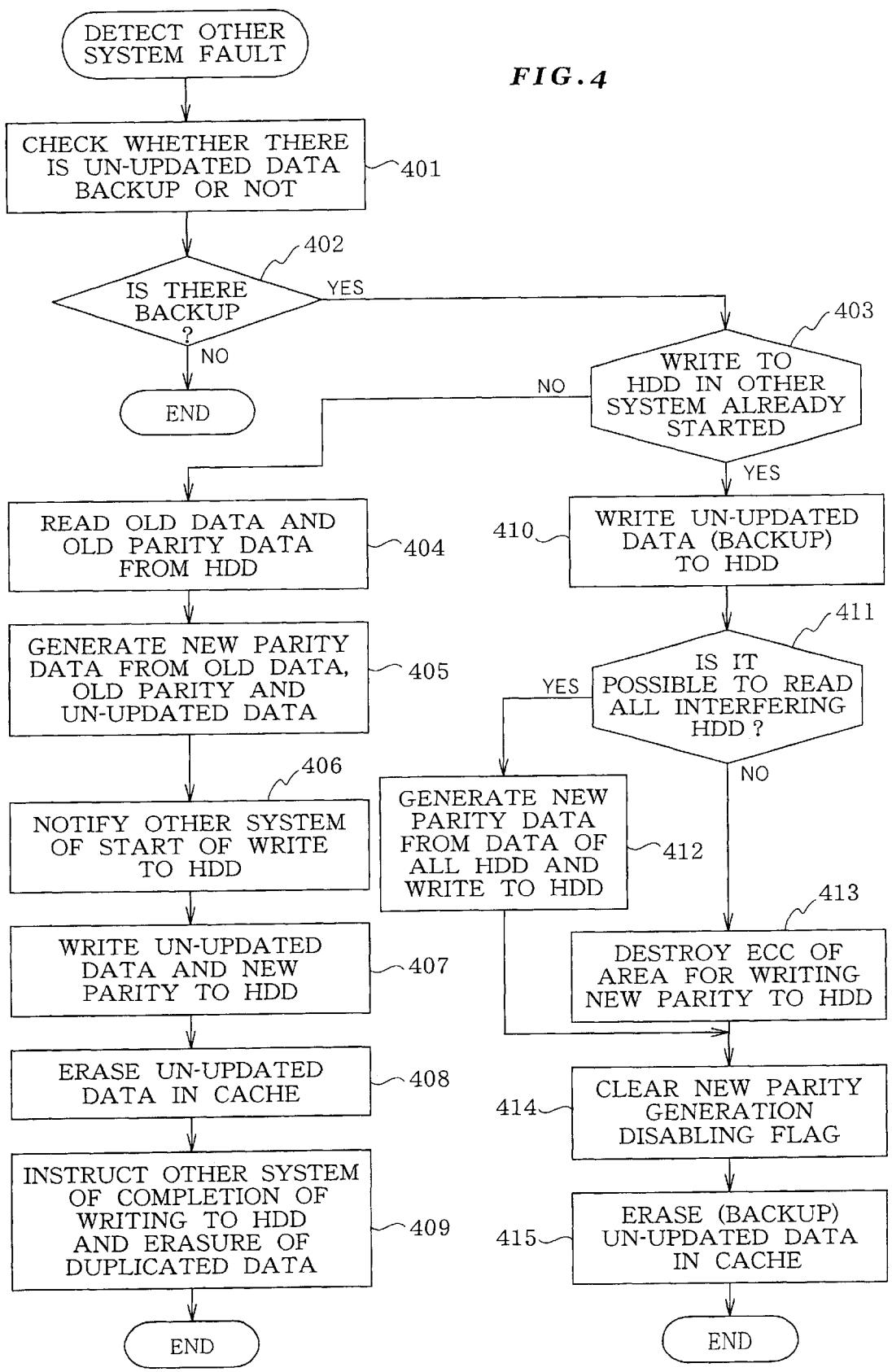
FIG. 4 is a flow chart showing data recovery processing of the disk array control apparatus shown in FIG. 1 when data write processing is stopped.

FIG. 4 is a flow chart showing the processing by the other array disk control apparatus 1' when a data write by the array disk control apparatus 1 is stopped.

As shown in FIG. 4, when a failure such as power interruption at the array disk control apparatus 1 is detected, the other array disk control apparatus 1' starts processing of taking over this processing. First, the other array disk control apparatus 1' checks whether the duplicated un-updated data 121', which is a backup of the un-updated data, exists in the cache memory 11' of the array disk control apparatus 1' or not (step 401). In the case where the backup data 121' of the un-updated data does not exist in the cache memory 11' (step 402, NO), it is decided that there is no stopped write processing and the processing is completed. On the other hand, in the case where the backup data 121' of the un-updated data exists (step 402, YES), it is decided that the write processing in the array disk control apparatus 1 has been stopped and processing of taking over the processing starts (step 402).

In the case where step 402 results in YES, when the write processing is stopped, the array disk control apparatus 1 decides whether a data write to the hard disk 100 has been started or not, that is, whether the processing has been stopped before or after the passing of the irreversible point (step 403). This decision can be made more specifically by deciding whether the parity generation disabling flag 14' of the array disk control apparatus 1' is in a disabled state or freed from a disabled state.

In the case where the disabled state of the parity generation disabling flag 14' is canceled (step 402, NO), the array disk control apparatus 1 decides that a data write to the hard disk 100 has not been started and processing similar to normal write processing is carried out by the array disk control apparatus 1'.

That is, the address stored in the cache memory 11' at which the backup un-updated data 121' is written and the corresponding parity address are calculated and the old data and old parity are read from the recording area in which these addresses exist (step 404). An exclusive OR between the old data, old parity and backup un-updated data 121' read in this way is calculated and new parity is created (step 405). Here, the parity generation disabling flag 14 in one array disk control apparatus 1 is set to a parity generation disabled state via the cross call controlling means 15' (step 406). Then, the backup un-updated data 121' and newly generated parity are written in a pre-calculated recording area (step 407) and when this writing to the disk 100 is completed, the un-updated data 121' is invalidated and erased from the cache memory 11' (step 408). Then, the original un-updated data 121 stored in the cache memory 11 of one array disk apparatus is erased and at the same time the parity generation disabled state of the parity generation disabling flag 14 is canceled (step 409).

The processing in step 406 and step 409 described above are instructions to the array disk control apparatus 1 that has stopped write processing due to a fault, and therefore need not always be executed, but processing totally identical to normal processing is performed here and the cross call controlling means 15' disables this processing.

On the other hand, in the case where the parity generation disabling flag 14' is not cancelled (step 403, YES) in step 403, it is decided that the array disk control apparatus 1 has started data writing to the hard disk 100 and the writing is stopped after the irreversible point is passed, and therefore processing different from normal write processing is required. That is, since the old data and old parity written in the disk 100 may be destroyed, it is not possible to create new parity using this data.

In this case, the un-updated data 121', which is backup data, is written in the disk (step 410). This writing sets data other than the parity to a writing completed state including the disk in which no rewrite has been performed. Then, whether the disk array apparatus has redundancy or not is checked (step 411) and if the disk array apparatus has redundancy (step 411, YES), new parity is created using data of the other disk and written in the block of the corresponding new parity (step 412). On the other hand, if the disk array apparatus has no redundancy due to a disk failure, etc. (step 411, NO), new parity cannot be created using the other disk array, and therefore the error correction code (ECC) of the block in which the new parity is to be written is destroyed so that a read error is output from the relevant block (step 413).

When the processing in step 412 or step 413 ends, the parity generation disabled state of the parity generation disabling flag 14' is canceled (step 414) and the backup un-updated 121' is invalidated and erased from the cache memory 11' (step 415) and the succeeded write processing is finished.

For simplicity of explanation, this embodiment is explained assuming that only one un-updated data 121 or one parity generation disabling flag 14 exists, but when a plurality of data items is processed simultaneously, it is possible to perform the same processing by providing parity generation disabling flags 14 corresponding in number with data items to be processed.

FIGS. 5a–5c and FIG. 6 are the drawings to describe the details of data writing when the old data and old parity are destroyed.

As described above, in the case where it is decided in step 411 that the disk array apparatus has redundancy, in step 412, it is possible to generate new parity by using data stored in another disk having consistency with the data to be written. For example, as shown in FIG. 5A, in the case where the parity data is destroyed, all hard disks 100 are available, two data items (DATA #1) and (DATA #2) are valid and this parity is (Parity #1-2), it is possible to simply obtain new parity from these two data items.

On the other hand, in the case where the hard disk in which the data (DATA #2) is to be written is faulty (step 411, NO), it is possible to restore the content of the data (DATA #2) only when (DATA #1) and parity (Parity #1-2) are valid. In the case where writing of data consistent with parity (Parity #1-2) fails due to a problem of the disk, the ECC of the data is destroyed (step 413) producing a parity (Parity #1-2) read error and preventing data from being recovered with wrong parity data (Parity #1-2) when the host device issues a data (DATA #2) read instruction.

This state is recovered by executing the data (DATA #2) read instruction from the host device. That is, as shown in FIG. 5B, when an attempt is made to execute a write instruction on the data (DATA #1), it is not possible to read the old parity because the ECC of the data (DATA #1) parity is destroyed, and therefore only overwriting of the data (DATA #1) is executed. In this state, though the content of the data (DATA #1) is correct, consistency between the (DATA #1) and parity (Parity #1-2) is not maintained.

On the other hand, as shown in FIG. 5C, when a write instruction on the data (DATA #2) is executed, the hard disk in which the data (DATA #2) sent from the host device is to be written is faulty and writing is not possible, and therefore it is possible to create new parity from this data and the content of the data (DATA #1) which can be read normally and overwrite the new parity together with normal ECC. This processing allows the already overwritten data (DATA #1) and parity (Parity #1-2) to become valid data having consistency and be restored as the content of data (DATA #2).

Figure 6:
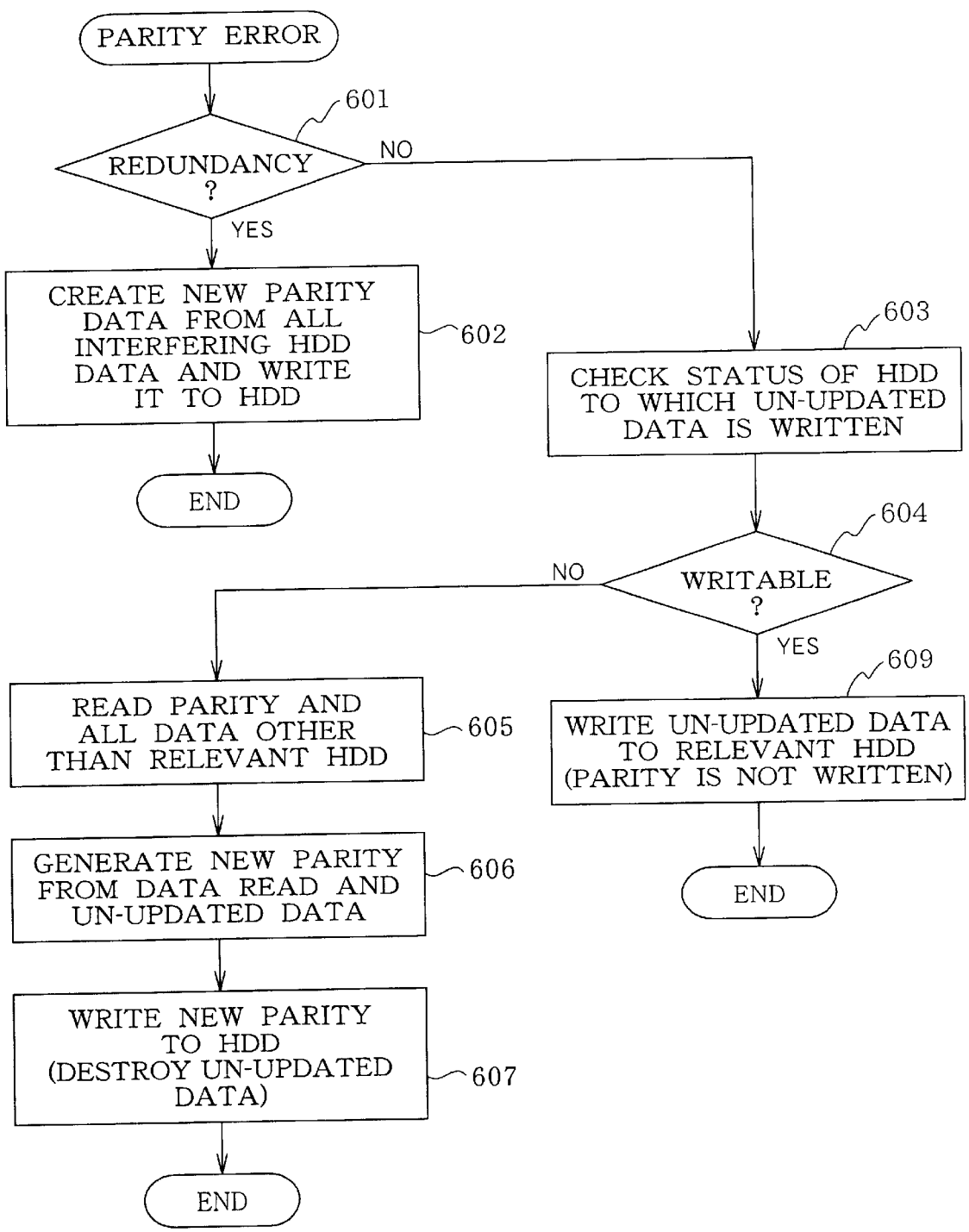
FIG. 6 is a flow chart showing recovery processing for data whose ECC has been destroyed during data recovery processing in the disk array control apparatus shown in FIG. 1.

The above operation will be explained by using the flow chart shown in FIG. 6.

First, it is decided whether the disk array apparatus has redundancy or not (step 601) and in the case where the disk array apparatus has redundancy (step 601, YES), new parity is created using all interfering disk data items and a write is performed to the block of the relevant parity (step 602). Operations of these steps 601 and 602 correspond to the operation in FIG. 5A above.

On the other hand, in the case where it is decided that the disk array apparatus has no redundancy (step 601, NO), it is checked whether the hard disk in which the un-updated data is to be written is, faulty or not (step 603). In the case where the hard disk is not faulty (step 604, YES), only un-updated data is written in this hard disk and the processing ends without writing the parity data (step 609). Operations of these steps 603, 604 and 609 correspond to the operation in FIG. 5B above.

On the other hand, in the case where the hard disk in which the un-updated data is to be written is faulty and it is not possible to write the un-updated data in this disk (step 604, NO), the parity data and all data stored in the disks other than the faulty disk are read (step 605) and new parity data is created from the data read and un-updated data (step 606). Then, the new parity data is written and the un-updated data is discarded and the processing ends (step 607). This new parity data is consistent with the un-updated data written in step 410 and these two data items are recovered as valid data. Operations of these steps 605, 606 and 607 correspond to the operation in FIG. 5C above. The parity generation disabling flag 14' of the array disk control apparatus 1' disables the generation of parity data from an exclusive OR of the old parity, old data and un-updated data, and therefore does not affect the generation of parity data here.

This configuration at least prevents wrong data from being written and reported to the host device. Furthermore, if conditions are met, even if the old data is destroyed, it is possible to appropriately recover the data and perform writing.

[Second Embodiment]

Figure 7:
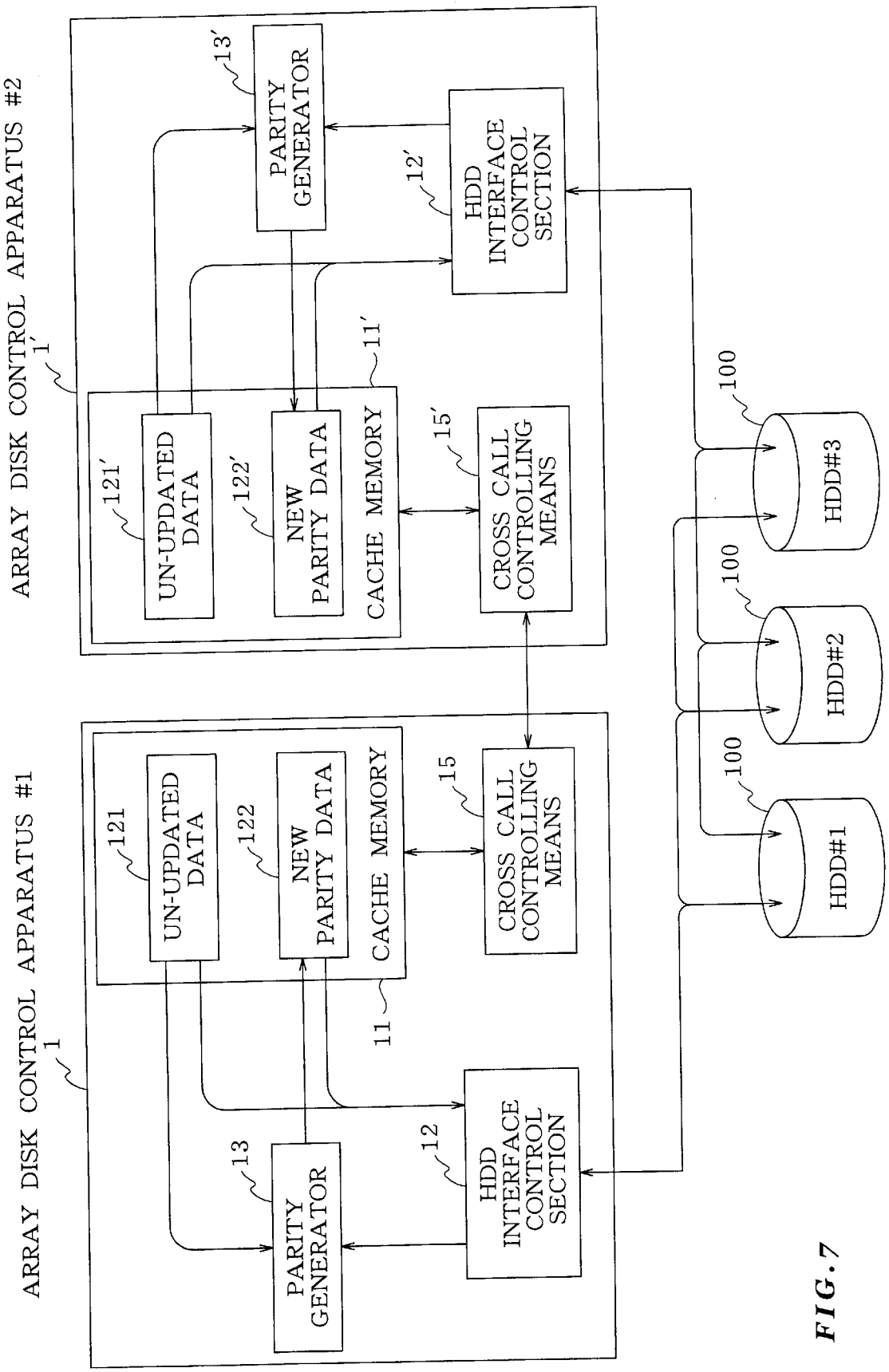
FIG. 7 is a block diagram showing a configuration of a second embodiment of the disk array control apparatus of the present invention.

FIG. 7 is a block diagram showing a configuration of a second embodiment of the disk array apparatus of the present invention. The second embodiment is also equipped with a plurality of hard disks 100 and two array disk control apparatuses 1 and 1' that control these hard disks 100, uses the hard disks 100 in parallel, forming a RAID. The control apparatuses 1 and 1' have the same configuration and are configured so as to be able to control data sent from the host device in duplicate. Since the second embodiment is the same as the first embodiment shown in FIG. 1 except the points described below, the same components will be assigned the same reference numerals and explanations thereof will be omitted.

As shown in FIG. 7, the second embodiment has no parity generation disabling flag 14 in the first embodiment, stores new parity data 122 in a cache memory 11 instead, duplicates this new parity data by transferring the new parity data to a cache memory 11' in the other array disk control apparatus 1' via a cross call controlling means 15 (new parity data 122') In this example, whether this duplicated new parity 122' exists or not decides whether the state is before or after the point at which processing of writing to the disk becomes irreversible.

In the case where, for example, writing is stopped due to a power failure, etc. after the point at which processing of writing to the disk becomes irreversible, the above-described first embodiment cannot assure the validity of the old data to generate new parity. Because of this, when the disk array apparatus has lost redundancy, it is not possible to generate new parity and it is only possible to recognize whether the relevant data is lost or not when data is read later.

On the contrary, the second embodiment decides through the existence of the duplicated new parity data 122' whether the time at which writing is stopped is before or after the point at which processing of writing to the disk becomes irreversible. In the case where the time at which writing is stopped is after the point at which write processing becomes irreversible, the second embodiment allows the write processing to be continued by using the duplicated new parity data 122'. Therefore, even if the disk array has lost redundancy and writing is stopped after the point at which write processing becomes irreversible, it is possible to write correct data without erasing data or causing errors during a data read.

Figure 8:
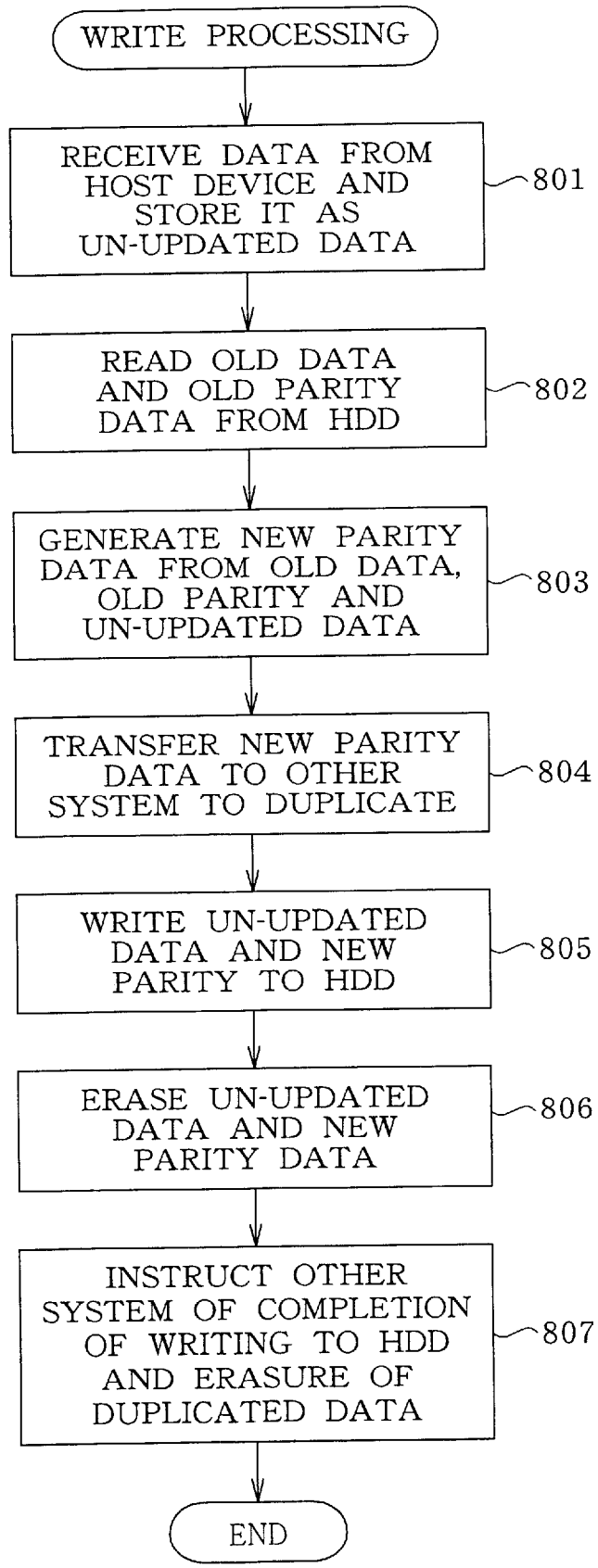
FIG. 8 is a flow chart showing data write processing in the disk array control apparatus shown in FIG. 7.

FIG. 8 is a flow chart showing a write processing operation in the second embodiment of the disk array apparatus according to the present invention.

Data is received by a write instruction from the host device and stored as un-updated data 121 in the cache memory 11 of one array disk control apparatus 1 and this data is copied to the cache memory 11' of the other array disk apparatus 1' to create duplicated un-updated data 121 (step 801). Then, the address at which the un-updated data is to be written and the address of the parity that corresponds to this are calculated and the old data and old parity are read from this address storage area (step 802). Then, new parity is generated from the old data, old parity read in this way and un-updated data 121 and stored as new parity data 122 in the cache memory 11 (step 803). Furthermore, this new parity data is transferred to the cache memory 11' in the other array disk control apparatus 1' via the cross call controlling means 15 and thereby the new parity is duplicated (step 804). Then, the un-updated data 121 and new parity 122 are written in a pre-calculated writing area (step 805) and when this writing is completed, the un-updated data 121 and new parity 122 are invalidated and erased from the cache memory 11 (step 806). Furthermore, the duplicated un-updated data 121' and new parity 122' are deleted from the cache memory 11' in the other array disk apparatus via the cross call controlling means 15 (step 807).

When this series of write processing has been completed normally, the other array disk control apparatus 1' only duplicates or erases the un-updated data 121 and new parity 122 and performs no processing of writing to the block, but in the case where the write processing is stopped because, for example, a power failure occurs with the array disk control apparatus 1 while write processing is in progress, this stoppage of processing is detected and the write processing is taken over by using the duplicated un-updated data 121' and new parity 122'.

Figure 9:
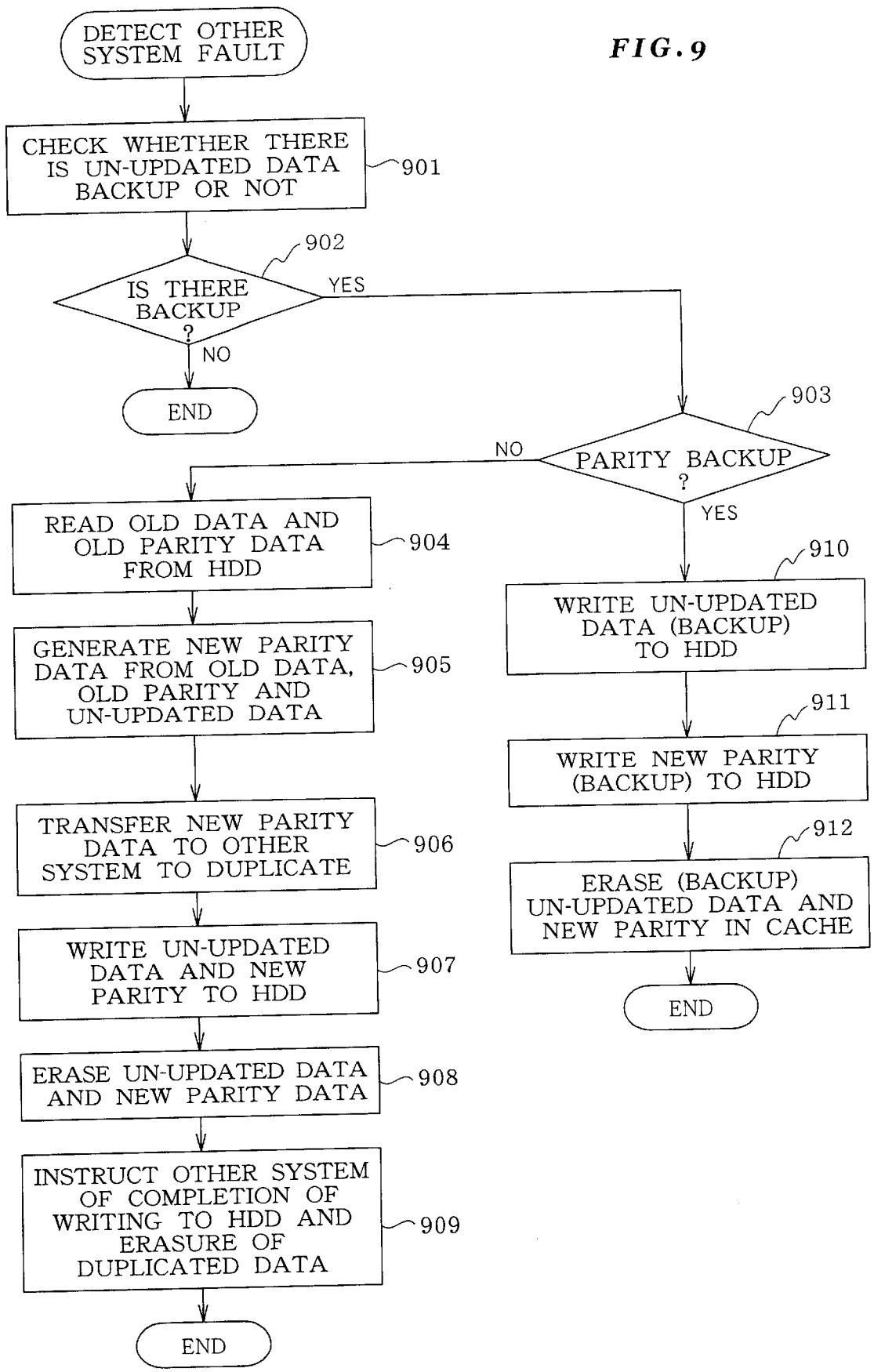
FIG. 9 is a flow chart showing data recovery processing in the disk array control apparatus shown in FIG. 7 when data write processing is stopped.
Figure 10:
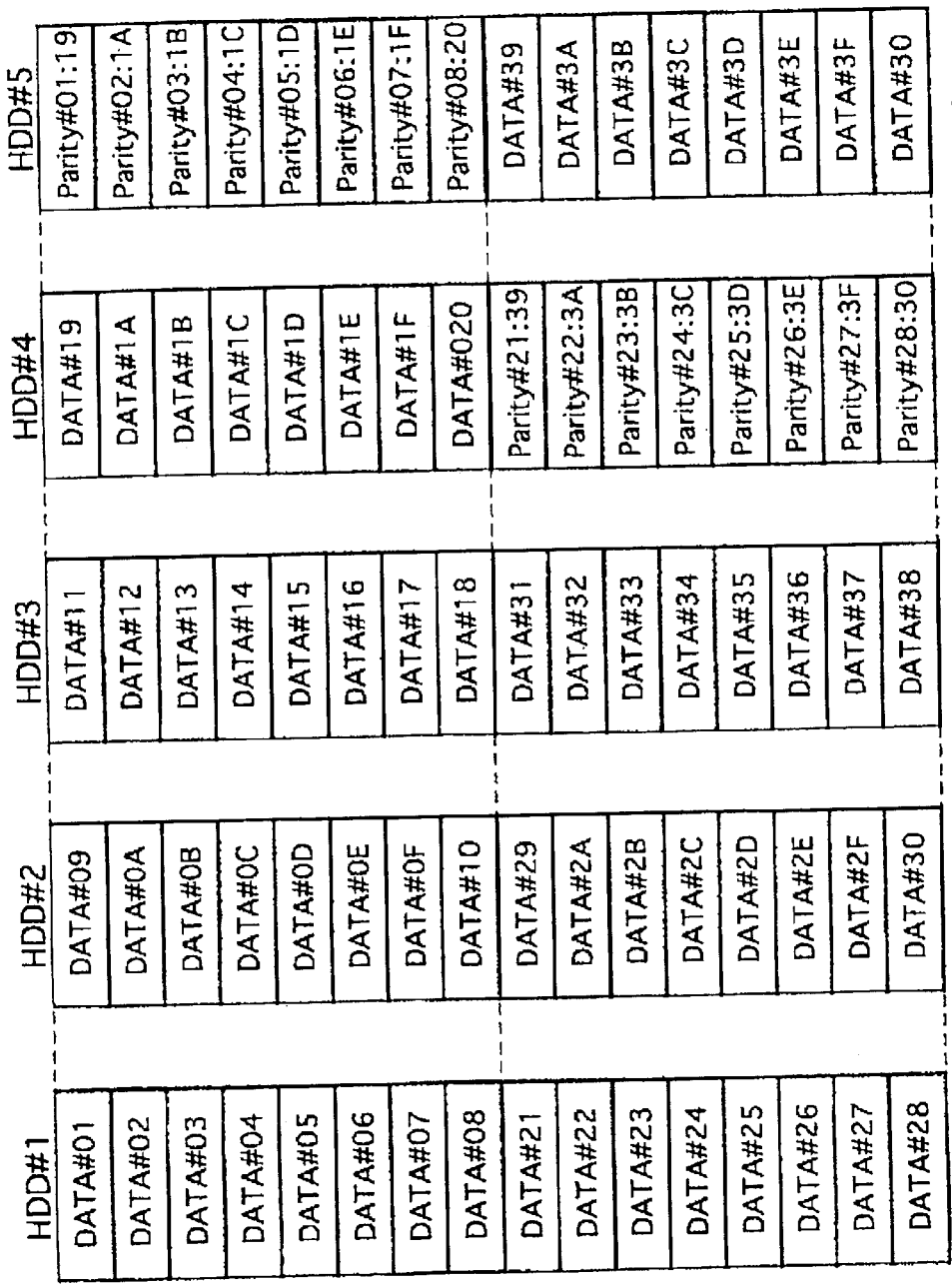
FIG. 10 illustrates an example of data arrangement on a disk having a level-5 RAID configuration.

FIG. 9 is a flow chart when the array disk control apparatus 1 stops write processing and the other array disk control apparatus 1' takes over this processing.

When an error such as power failure is detected in the array disk control apparatus 1, which is executing write processing, the other array disk control apparatus 1' first checks whether the backup data of the un-updated data 121, that is, the duplicated un-updated data 121' exists inside the cache memory 11' of the relevant control apparatus 1' or not (step 901). In the case where the backup data 121' of the un-updated data does not exist in the cache memory 11' (step 902, NO), it is decided that there is no stopped write processing and the processing ends.

On the other hand, in the case where the backup data 121' of the un-updated data exists in the cache memory 11' (step 902, YES), it is decided that writing has been stopped and the processing is taken over (step 902).

First, whether the write processing has been stopped before or after the passing of the irreversible point is decided by whether duplicated new parity data 122' exists in the cache memory 11' of the array disk control apparatus 1' or not (step 903).

In the case where the new parity data 122' is not stored in the cache memory 11', this means that the write processing in the array disk control apparatus 1 has been stopped before the irreversible point, and therefore normal write processing is performed using the duplicated un-updated data 121'.

That is, the address at which the backup un-updated data 121' is to be written and the address of the corresponding parity are calculated and the old data and old parity are read from their respective recording areas (step 904). Then, an exclusive OR of the old data, old parity and backup un-updated data 121' is calculated, and thereby new parity 122' is generated and stored in the cache memory 11' (step 905). Then, the new parity 122 is transferred to the cache memory 11 in the one array disk control apparatus 1 via the cross call controlling means 15' and thereby the new parity is duplicated (step 906). The un-updated data 121', which is backup data, and newly generated parity 122' are written in a pre-calculated area (step 907) and when this writing is completed, the un-updated data 121' and new parity 122' are invalidated and deleted from the cache memory 11' (step 908) and at the same time the original un-updated data 121 is deleted from the cache memory 11 in the array disk control apparatus 1 via the cross call controlling means 15 (step 909).

Operations in step 906 and step 909 are instructions to the faulty array disk control apparatus 1, and therefore these operations need not be executed, but here the same processing as normal processing is executed and invalidated by the cross call controlling means 15'.

On the other hand, in the case where the new parity 122' is stored in the cache memory 11' of the array disk apparatus 1' (step 903, YES), this means that write processing in the array control apparatus 1 has been stopped after the passing of the irreversible point, and therefore processing different from normal write processing needs to be performed.

Here, the old data and old parity written in the disk 100 may have been destroyed, but since the parity data 122' for a backup of the new parity 122 generated using the old data and old parity is saved in the cache memory 11', there is no need to generate new parity. Therefore, the backup data 121' for the un-updated data 121 is written in a predetermined disk (step 910) and the duplicated new parity 122' is written in the predetermined disk (step 911). When writing of these backup un-updated data 121' and backup new parity 122' is completed, the backup un-updated data 121' and backup new parity 122' are invalidated and erased from the cache memory 11' and write processing ends (step 912).

For simplicity of explanation, the above-described embodiment describes the case where only one un-updated 121 and one new parity 122 exist, but in the case where a plurality of blocks is processed simultaneously, duplicating new parities 122 corresponding in number with the blocks can achieve the same effect.

Like this, when write processing of the array disk control apparatus 1 is stopped, the second embodiment duplicates new parity generated and thereby makes it possible to decide whether write processing has been stopped before or after the irreversible point of the processing. Therefore, even if the processing is stopped after the passing of the irreversible point, the duplicated new parity 122' can be used and there is no need to newly generate new parity, and in this way data is not lost even if writing is stopped while redundancy of the disk array is lost.

As described above, even if processing of writing to the disk is stopped due to a power failure, etc., the present invention makes it possible to clearly know whether write processing is stopped before or after a point at which write processing becomes irreversible by notifying the irreversible point between two array disk control apparatuses and appropriately take over the write processing according to the point at which the write processing is stopped. Therefore, the present invention eliminates the problem of generating wrong parity data and writing data and can provide a highly reliable disk array processing apparatus capable of writing data without data getting garbled even if writing is stopped at any time.

Furthermore, when writing is stopped while the disk array apparatus has redundancy, the present invention can repair without losing data, and even if writing is stopped while the disk array apparatus has no redundancy, the present invention can at least eliminate the problem of wrong data being sent to the host device.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus configured in such a way as to comprise a plurality of controlling means for recording data received from a host device on an information recording medium with each controlling means having memory, temporarily store said data in memory of one controlling means and at the same time store said data in duplicate in memory of the other controlling means and, when data recording processing carried out by said one controlling means is stopped, allow said other controlling means to continue the recording processing by using said duplicated data and allow said other controlling means to continue processing of updating said data by using said duplicated data, wherein a point at which the data updating processing in said one control apparatus becomes irreversible is notified from the control apparatus to the control apparatus having said duplicated data, said each controlling means comprising:

interface means for communicating with said recording medium;

parity generating means for generating parity data on said data;

inter-controlling-means information communicating means for communicating information between control means; and a parity generation disabling flag.

2. An information recording apparatus configured in such a way as to comprise a plurality of controlling means for recording data received from a host device on an information recording medium with each controlling means having memory, temporarily store said data in memory of one controlling means and at the same time store said data in duplicate in memory of the other controlling means and, when data recording processing carried out by said one controlling means is stopped, allow said other controlling means to continue the recording processing by using said duplicated data and allow said other controlling means to continue processing of updating said data by using said duplicated data, wherein a point at which the data updating processing in said one control apparatus becomes irreversible is notified from the control apparatus to the control apparatus having said duplicated data, said each controlling means comprising:

interface means for communicating with said recording medium;

parity generating means for generating parity data on said data;

inter-controlling-means information communicating means for communicating information between control means, wherein when said one recording means stops data recording processing, notification that the data recording processing becomes irreversible is made by storing parity data on the data to be subjected to said recording processing created by said one controlling means in the memory of the other recording means that stores said duplicated data.

3. An information recording method using an information recording apparatus configured in such a way as to comprise a plurality of controlling means for recording data received from a host device on an information recording medium with each controlling means having memory, temporarily store said data in memory of one controlling means and at the same time store said data in duplicate in memory of the other controlling means and, when data recording processing carried out by said one controlling means is stopped, allow said other controlling means to continue the recording processing by using said duplicated data and allow said other controlling means to continue processing of updating said data by using said duplicated data, wherein a point at which the data updating processing in said one control apparatus becomes irreversible is notified from the control apparatus to the control apparatus having said duplicated data, wherein the method records the data received from the host device on a recording medium, creates parity data on this data and records the parity data on a predetermined recording medium, configured in such as way as to temporarily store un-updated data sent from said host device in memory of one of a plurality of recording medium controlling means each having memory, store said un-updated data in duplicate in the other controlling means, allow said one controlling means to create new parity data on said un-updated data from un-updated data sent from the host device, old data recorded in an area of said recording medium in which said un-updated data is to be recorded and parity data of said old data, write said un-updated data and said new parity data in a predetermined area of said recording medium, wherein when said one controlling means writes said un-updated data or said new parity data in said disk, the other controlling means that stores said duplicated data is notified of the point at which processing of recording said un-updated data becomes irreversible.

4. An information recording method using the information recording apparatus according to claim 1, said one controlling means configured in such way as to create new parity data on un-updated data from said un-updated data sent from said host device, old data recorded in an area of said recording medium in which said un-updated data is to be recorded and parity data of said old data and write said un-updated data and said new parity data in a predetermined area of said recording medium, wherein when said one controlling means writes said un-updated data or said new parity data in said disk, said parity generation disabling flag of the other controlling means that stores said duplicated data is set to a parity generation disabled state.

5. The information recording method according to claim 4, wherein when said one controlling means stops data writing to the recording medium after the other controlling means that stores said duplicated data is notified of parity data recreation disabling, it is decided whether there is redundancy in said information recording apparatus or not, and if no redundancy exists, the duplicated data stored in said other controlling means is written in a predetermined recording medium and the memory of said other controlling means that stores said duplicated data stores information that parity data on said data is invalid.

6. The information recording method according to claim 5, wherein when said one controlling means stops data writing to the recording medium after the other controlling means that stores said duplicated data is notified of parity data recreation disabling, it is decided whether there is redundancy in said information recording apparatus or not, and if no redundancy exists, the duplicated data stored in said other controlling means is read, new parity is generated from data stored in a data recording area other than the area in which said data is to be recorded, this parity is overwritten in a parity data write area and the information that the parity data in memory of said other controlling means is invalid is erased.

7. An information recording method using the information recording apparatus according to claim 2, said one controlling means configured in such way as to create new parity data on un-updated data from said un-updated data sent from said host device, old data recorded in an area of said recording medium in which said un-updated data is to be recorded and parity data of said old data and write said un-updated data and said new parity data in a predetermined area of said recording medium, wherein when said one controlling means writes said un-updated data or said new parity data in said disk, said new parity data is copied and stored in the other controlling means that stores said duplicated data.

* * * * *